(12) United States Patent
Westerling

(10) Patent No.: US 8,933,835 B2
(45) Date of Patent: Jan. 13, 2015

(54) TWO-CHANNEL DIRECTIONAL ANTENNA AND A RADAR LEVEL GAUGE WITH SUCH AN ANTENNA

(71) Applicant: Rosemount Tank Radar AB, Gothenburg (SE)

(72) Inventor: Jan Westerling, Linkoping (SE)

(73) Assignee: Rosemount Tank Radar AB, Gothenburg (SE)

(*) Notice: Subject to any disclaimer, the term of this patent is extended or adjusted under 35 U.S.C. 154(b) by 298 days.

(21) Appl. No.: 13/626,349

(22) Filed: Sep. 25, 2012

(65) Prior Publication Data
US 2014/0085129 A1    Mar. 27, 2014

(51) Int. Cl.
| | | |
|---|---|---|
| G01S 13/08 | (2006.01) |
| G01S 13/00 | (2006.01) |
| H01Q 13/10 | (2006.01) |
| H01Q 9/28 | (2006.01) |
| G01S 13/88 | (2006.01) |
| H01Q 1/22 | (2006.01) |

(Continued)

(52) U.S. Cl.
CPC  *G01S 13/08* (2013.01); *H01Q 9/28* (2013.01); *G01S 13/88* (2013.01); *H01Q 1/225* (2013.01); *H01Q 13/02* (2013.01); *H01Q 19/08* (2013.01)
USPC .......... 342/124; 342/118; 342/175; 343/772; 343/786

(58) Field of Classification Search
CPC .................. H01Q 5/0096; H01Q 9/28; H01Q 13/00–13/065; H01Q 15/14; H01P 1/22; H01P 1/222; H01P 3/00; H01P 3/12–3/127; H01P 7/00–7/105

USPC .................. 342/1–4, 118, 124, 175; 343/762, 343/771–786, 884
See application file for complete search history.

(56) References Cited

U.S. PATENT DOCUMENTS

| 3,182,322 A | * | 5/1965 | Nankervis ..................... 342/104 |
| 3,611,396 A | * | 10/1971 | Jones, Jr. ....................... 343/776 |
| 3,883,877 A | * | 5/1975 | Chabah et al. ................ 343/778 |

(Continued)

FOREIGN PATENT DOCUMENTS

| DE | 10 2009 028 620 | 2/2011 |
| DE | 10 2010 031 276 | 1/2012 |

(Continued)

OTHER PUBLICATIONS

Notification of transmittal of the International Search Report and the Written Opinion of the International Searching Authority, PCT/SE2013/000131, dated Feb. 13, 2014.

*Primary Examiner* — Peter Bythrow
(74) *Attorney, Agent, or Firm* — Westman, Champlin & Koehler, P.A.

(57) ABSTRACT

A two-channel directional antenna for use in a radar level gauge. The antenna comprises a partition wall dividing the antenna into a first partition for emitting an electromagnetic transmit signal, and a second partition for receiving an electromagnetic echo signal, the partition wall having an outer potion located downstream in a direction of radiation of the antenna. The partition wall comprises an electromagnetic de-coupling structure, which is arranged to reduce any leakage of electromagnetic energy from the transmit signal into the echo signal.
The electromagnetic de-coupling structure according to the present invention ensures that the leakage of transmit signal into the received signal is reduced to a satisfactory level.

24 Claims, 5 Drawing Sheets

(51) Int. Cl.
*H01Q 13/02* (2006.01)
*H01Q 19/08* (2006.01)

(56) References Cited

U.S. PATENT DOCUMENTS

| | | | | |
|---|---|---|---|---|
| 4,107,690 A | * | 8/1978 | Trentini et al. | 342/427 |
| 4,667,205 A | * | 5/1987 | Gehin | 343/783 |
| 5,109,232 A | * | 4/1992 | Monte | 343/785 |
| 5,821,906 A | * | 10/1998 | Campan | 343/786 |
| 6,031,504 A | | 2/2000 | McEwan | 343/786 |
| 6,075,495 A | * | 6/2000 | Podgorski | 343/786 |
| 6,118,412 A | * | 9/2000 | Chen | 343/756 |
| 6,201,508 B1 | * | 3/2001 | Metzen et al. | 343/778 |
| 6,211,838 B1 | * | 4/2001 | Cherrette et al. | 343/786 |
| 6,672,155 B2 | * | 1/2004 | Muller et al. | 73/290 V |
| 8,125,400 B2 | * | 2/2012 | Bezuidenhout et al. | 343/781 R |
| 8,786,508 B1 | * | 7/2014 | Edwards et al. | 343/786 |
| 2002/0080080 A1 | | 6/2002 | Kloefer et al. | |
| 2004/0056667 A1 | * | 3/2004 | Lutke et al. | 324/644 |
| 2007/0159406 A1 | * | 7/2007 | Rao et al. | 343/772 |
| 2008/0191949 A1 | * | 8/2008 | Rao et al. | 343/703 |
| 2009/0021441 A1 | * | 1/2009 | Ohno | 343/776 |
| 2009/0079649 A1 | * | 3/2009 | Steghafner et al. | 343/786 |
| 2009/0212996 A1 | * | 8/2009 | Chen et al. | 342/124 |
| 2010/0031753 A1 | | 2/2010 | Mayer et al. | |
| 2010/0097283 A1 | * | 4/2010 | Hino et al. | 343/786 |
| 2010/0123636 A1 | * | 5/2010 | Bezuidenhout et al. | 343/756 |
| 2012/0186339 A1 | | 7/2012 | Feisst et al. | |
| 2013/0113500 A1 | | 5/2013 | Chen et al. | |
| 2013/0271334 A1 | * | 10/2013 | Tahmisian et al. | 343/776 |

FOREIGN PATENT DOCUMENTS

| | | |
|---|---|---|
| GB | 1 105 503 | 3/1968 |
| WO | WO 2010/136276 | 12/2010 |

* cited by examiner

TWO-CHANNEL DIRECTIONAL ANTENNA AND A RADAR LEVEL GAUGE WITH SUCH AN ANTENNA

FIELD OF THE INVENTION

The present invention relates to a level gauge system using electromagnetic waves for measuring a filling level of a surface of a product in a container.

BACKGROUND OF THE INVENTION

Radar level gauges (RLGs) are suitably used for making non-contact measurements of the level of products such as process fluids, granular compounds and other materials contained in a tank. An example of such a radar level gauge can include a transceiver for transmitting and receiving electromagnetic waves, an antenna arranged to direct electromagnetic waves towards the surface and to return electromagnetic waves reflected by the surface to the transceiver, and processing circuitry adapted to determine the filling level based on a relation between electromagnetic waves transmitted and received by the transceiver.

In some applications, e.g. level detection of solids, such as grain, very high sensitivity is required due to the weak reflection from the surface. Also other factors, such as interference and impurities on the antenna affect the signal strength and thus the sensitivity requirements.

In such situations, it becomes relevant to reduce the coupling between the transmit channel and the receive channel, and to reduce leakage of electromagnetic energy from the comparatively strong transmit signal into the comparatively weak echo signal which may take in the antenna.

A solution to increase sensitivity would therefore be to use separate antennas for the transmit channel and the reception channel. If the electrical coupling between antennas are at least −50 dB, the sensitivity of such a system may be increased to 40-50 dB, compared to typical values of conventional systems of around 100 dB.

However, for practical reasons, it is not desirable to implement a two-antenna system in commercial RLG-systems. First of all there would be a significant cost increase, making such a system unattractive for the main market. Also, in many applications it is desirable to have as few openings in the tank as possible. Also for this reason, a two-antenna system is less attractive, at least if each antenna requires a separate opening in the tank wall.

Attempts have been made in the prior art to divide a single antenna into a transmitting portion and a receiving portion. For example, GB 1,105,503 discloses a parabolic antenna divided into two halves which are also separated from each other by a distance. However, existing prior art solutions have not been found adequate for use in radar level gauges.

GENERAL DISCLOSURE OF THE INVENTION

It is an object of the present invention to provide a dual channel antenna with performance adequate for use in a radar level gauge.

According to a first aspect of the present invention, this and other objects are achieved by a level gauge for determining a filling level of a product in a tank, the radar level gauge comprising a transceiver for transmitting an electromagnetic transmit signal and receiving an echo signal, processing circuitry connected to the transceiver and adapted to determine the filling level based on a relationship between the transmit signal and the echo signal, and a two-channel, directional antenna having an antenna aperture adapted to emit electromagnetic energy in a direction of radiation. The antenna is connected to the transceiver and arranged to emit the transmit signal into the tank towards a surface of the product, and to receive the echo signal resulting from a reflection of the transmit signal in the product surface, wherein the antenna comprises an antenna aperture intended to face the product surface. The arrangement further comprises a partition wall dividing the antenna into a first partition for emitting the transmit signal and a second partition for receiving the echo signal, the partition wall having an outer potion located downstream in the direction of radiation. The arrangement further comprises an electromagnetic coupling arrangement comprising a first waveguide feeder arranged to couple the transmit signal from the transceiver into the first antenna partition, and a second waveguide feeder arranged to couple the echo signal from the second antenna partition to the transceiver, The partition wall includes an electromagnetic de-coupling structure, connected to the outer portion of said partition wall and arranged to reduce any leakage of electromagnetic energy from said transmit signal into said echo signal.

The electromagnetic de-coupling structure according to the present invention ensures that the leakage of transmit signal into the received signal is reduced to a satisfactory level.

The expression "directional antenna" is intended to include any antenna where the radiation pattern is directed or amplified in a specific direction. Examples of such antennas include horn antennas, parabolic reflector antennas, and array antennas. The surface from which radiation is emitted in a directional antenna is referred to as an antenna aperture. In the case of horn antennas and parabolic reflector antennas the aperture is defined by an opening of a geometrically delimited interior space of the antenna. The direction of radiation will be determined by the orientation of this opening. In the case of an array antenna the aperture may be a planar surface on which the array of emitters is arranged, and the direction of radiation will be determined by the orientation of the individual emitters.

In order to reach the receiving partition, the transmit signal will need to travel along first the side of the partition wall facing the transmit partition, and then along the side of the partition wall facing the receiving partition. According to embodiments of the invention, the electromagnetic de-coupling structure may be arranged on the partition wall and adapted to attenuate propagation of electromagnetic waves along the partition wall. Such de-coupling structures include quarter wave chokes and electromagnetic wave attenuating material.

According to one embodiment, the partition wall includes a protruding lip portion extending outside the antenna opening, and the electromagnetic de-coupling structure is arranged at least partly on this protruding lip portion. The coupling between the first and second antenna portions is thus significantly reduced by means of the protruding lip portion, extending a distance outside the antenna mouth. The coupling between the two partitions is thus reduced not only inside the antenna, but also a distance outside the antenna opening.

The electromagnetic de-coupling structure may further comprise a dielectric lens arranged at the aperture of the antenna. Such a lens may also compensate for any disturbance in the phase front of the antenna transmission caused by the partition wall and any protruding lip portion.

A second aspect of the present invention relates to a two-channel antenna, for use in a radar level gauge, the antenna comprising an antenna mouth and a partition wall dividing the antenna into a first partition for emitting an electromagnetic transmit signal, and a second partition for receiving an electromagnetic echo signal, wherein the partition wall includes an electromagnetic de-coupling structure, arranged to reduce any electromagnetic coupling between the transmit signal and the echo signal.

A third aspect of the present invention relates to a method for gauging a filling level of a product in a tank using a level gauge according to the first aspect.

BRIEF DESCRIPTION OF DRAWINGS

The present invention will be described in more detail with reference to the appended drawings, showing currently preferred embodiments of the invention.

DETAILED DESCRIPTION OF CURRENTLY PREFERRED EMBODIMENTS

Figure 1:
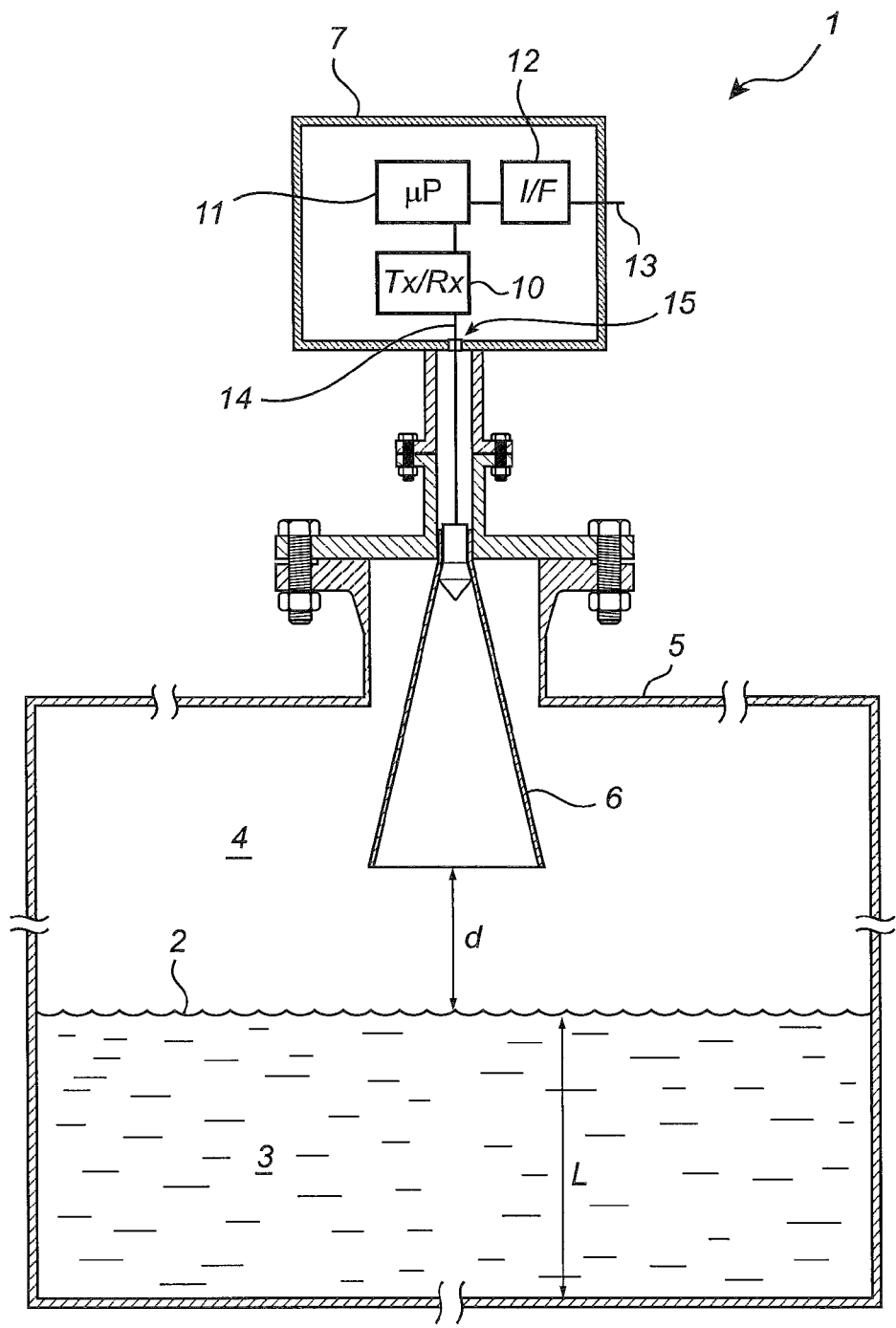
FIG. 1 is a schematic view of a radar level gauge system mounted on a tank.

FIG. 1 shows a perspective view of a radar level gauge (RLG) 1, according to an embodiment of the present invention. The gauge 1 is arranged to perform measurements of a process variable in a tank 5, such as the level L of an interface 2 between two (or more) materials 3, 4 in the tank 5. Typically, the first material 3 is a content stored in the tank, e.g. a liquid such as gasoline, but non liquid materials such as grain or pellets may also be detected. The second material 4 is typically air or some other atmosphere present in the tank above the first material 3. The RLG will enable detection of the distance d to the interface 2 in the tank, and this distance may be used to calculate the level L, or some other process variable of interest.

The RLG 1 further comprises a free radiating directional antenna 6 in the top of the tank for emitting electromagnetic transmit signals into the tank 5 and for receiving electromagnetic echo signals from the tank. The RLG 1 further comprises an electronics unit 7.

As is schematically illustrated in FIG. 1, the electronics unit 7 comprises a transceiver 10 for transmitting and receiving electromagnetic signals and a processing unit 11, which is connected to the transceiver 10 for control of the transceiver and processing of signals received by the transceiver for determination of the filling level L of the product 3 in the tank 5. The transceiver 10 may be one functional unit capable of transmitting and receiving electromagnetic signals, or may be a system comprising separate transmitter and receiver units. The processing unit 11 is connectable to external communication lines 13 for analog and/or digital communication via an interface 12. Moreover, although not shown in FIG. 1, the radar level gauge system 1 is typically connectable to an external power source, or may be powered through the external communication lines 13. Alternatively, the radar level gauge system 1 may be configured to communicate wirelessly.

Various detection schemes may be applied, including frequency modulated continuous wave (FMCW) and time domain reflectometry (TDR) detection using modulated pulse train signals. The RLG in the illustrated embodiment is adapted to transmit signals in the microwave range, typically in a frequency band around a center frequency of 10 GHz or 26 GHz.

The distribution of signals between measurement electronics unit 7 and the antenna 6 may, as shown in FIG. 1, be accomplished by means of a transmission line 14. This transmission line 14 is preferably provided by means of a coaxial wire, but may likewise be provided by any appropriate wave guide. Coaxial lines, micro strip lines, strip lines or other TEM-lines inherently have wideband functionality and can be used.

The RLG is preferably provided with a feed through structure 15, allowing the transmission line 14 to pass through the tank wall. This feed through structure 15 may provide a gas tight sealing capable of withstanding temperature, pressure, and any chemicals contained in the tank.

According to the present invention, the antenna 6 in the radar level gauge 1 in FIG. 1 is arranged to provide two separated channels for electromagnetic signals. More detailed embodiments of such antennas will be described with reference to the FIGS. 2-5, showing various examples of horn antennas and parabolic reflector antennas. It is noted that the illustrated antennas share the common feature that they have an antenna aperture defined by an opening of a geometrically delimited interior space of the antenna, e.g. the horn in the case of a horn antenna or the parabolic reflector in the case of a parabolic reflector antenna. However, the present invention is not limited to such antennas, but also includes other directional antennas, such as array antennas, which may have a planar aperture.

Figures 2A, 2B:
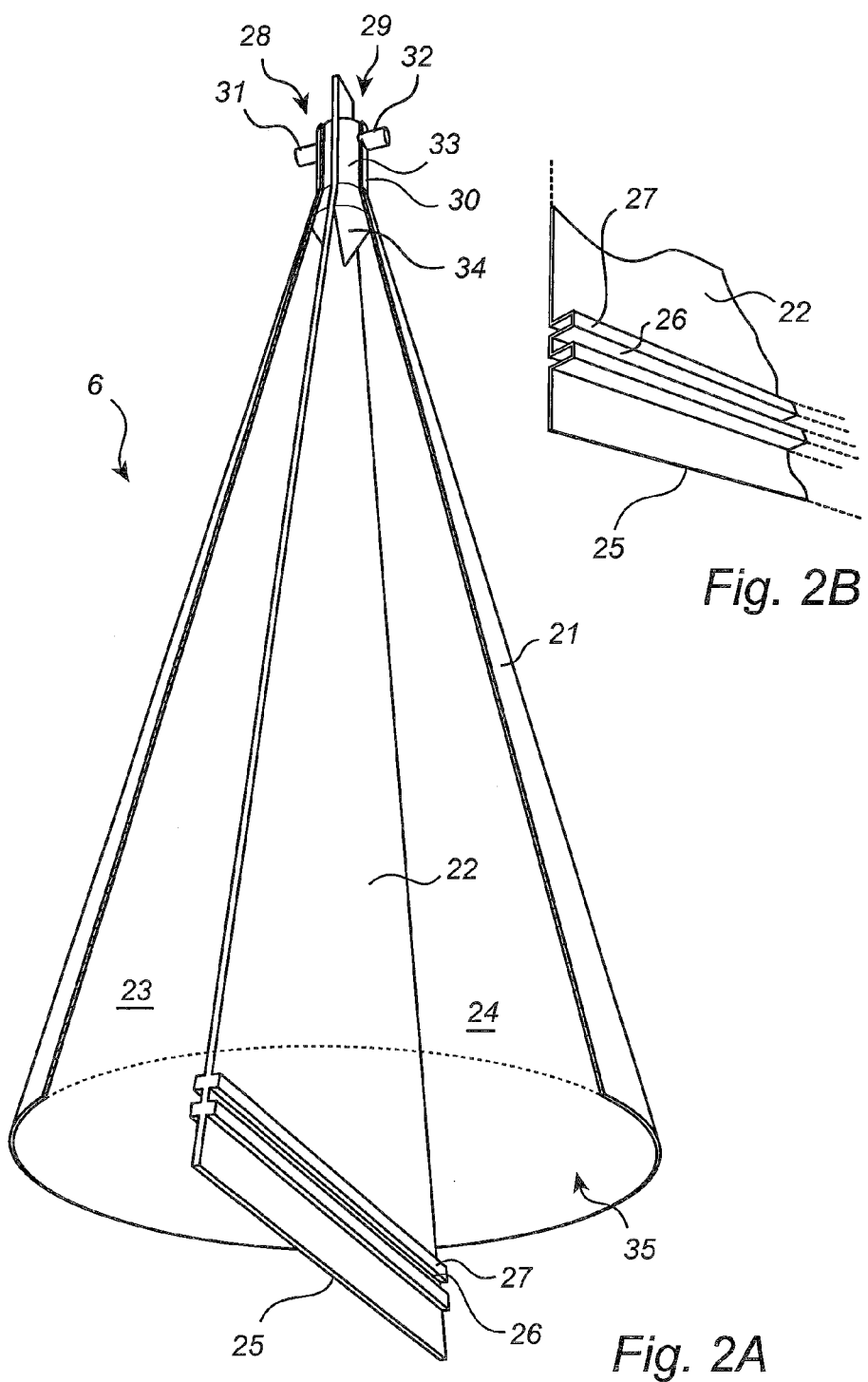
FIG. 2A is a perspective view of a horn antenna according to a first embodiment of the present invention.
FIG. 2B shows a detail of FIG. 2A.

The antenna 6 in FIG. 2A is a horn antenna, having an antenna aperture defined by the opening 35 of a substantially conical antenna horn 21. A partition wall, here in the form of a metal plate 22, is arranged in the interior of the horn 21, so as to extend between the interior walls of the horn thereby dividing it into two partitions, a transmit partition 23 and a receive partition 24. The plate 22 may be of electrically conducting material, e.g. a metal, or any other suitable material providing electromagnetic separation. The plate 22 may be arranged in a plane including the central axis A of the antenna. In this case, if the horn 21 is rotational symmetric, the partitions 23, 24 will be of equal size and shape.

The plate 22 further includes an electromagnetic de-coupling structure 26. The electromagnetic de-coupling structure 26 is here designed to attenuate propagation of electromagnetic waves in the operating frequency band of the gauge along the surface of the partition wall, and is then preferably formed on either or on both sides of the partition wall. Alternatively, the electromagnetic de-coupling structure may be located downstream of the partition wall, such as in the case of a dielectric lens, discussed below in relation to FIG. 4.

In the example in FIG. 2A, the electromagnetic de-coupling structure is formed by quarter wave chokes 26, here formed as grooves 26 between ridges 27 extending across the width of the metal plate, i.e. across the entire mouth 35 of the antenna horn 21. The ridges 27 extend substantially perpendicularly to the direction of radiation of the antenna. The depth of each choke (i.e. groove 26) is in the order of a quarter of a wavelength of the center operating frequency, about 7.5 mm at 10 Ghz and about 2.8 mm at 26 GHz. The width across the ridges is typically a few mm, but depends on the specific design and implementation and may be determined by the person skilled in the art.

FIG. 2b shows an alternative way to form the grooves 26, by folding the plate 22 into a "square wave" pattern. In this case, a groove 26 on one side corresponds to a ridge 27 on the opposite side.

The partition wall 22 in FIG. 2A further has a protruding lip portion 25 extending outside the opening 35 of the horn 21 and arranged to further reduce any electromagnetic coupling between signals in the two partitions 23, 24. In the embodiment illustrated in FIG. 2A, the electromagnetic de-coupling structure is arranged on the protruding lip portion of the partition wall.

In the cylindrical neck portion 30 of the antenna is provided a electromagnetic coupling arrangement having an Rx port 28 and a Tx port 29, each connected to the transceiver 10 (see FIG. 1). The transmission line 14 in FIG. 1 is consequently adapted to connect the transceiver 10 to each of the two ports 28, 29. The ports 28, 29 are separated by the partition wall 22. The Tx port 28 comprises a first waveguide feeder 31 arranged to couple a transmit signal from the transceiver 10 into the transmit partition 23, while the Rx port 29 comprises a second waveguide feeder 32 arranged to couple an echo signal from the receive partition 24 to the transceiver 10. Each port 28, 29 further comprises a dielectric filling material 33 e.g. made of Teflon, formed to provide a matching transition between the guided propagation in probes 31 and 32 and the free propagation in the antenna horn partitions 23, 24. In FIG. 2A the filling material 33 forms a tapered tip 34, extending from the neck portion 30 into the narrow portion of the conical horn 31.

Figure 3:
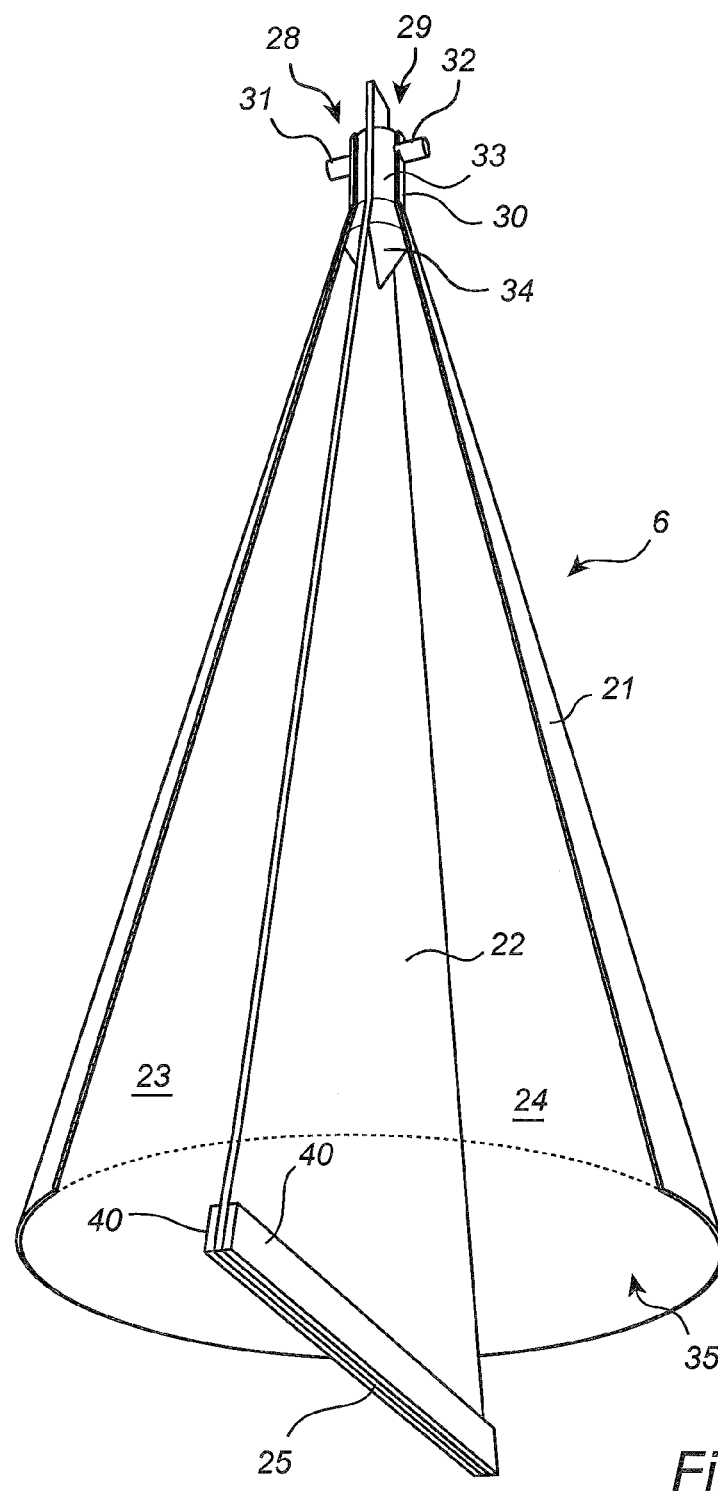
FIG. 3 is a perspective view of a horn antenna according to a second embodiment of the present invention.

The antenna 6' in FIG. 3 is substantially similar to the antenna in FIG. 2A, and will not be described in further detail. In this case the electromagnetic de-coupling structure comprises an electromagnetic wave attenuating material 40 provided on at least one side of the partition wall 22, here on the protruding lip portion 25. The electromagnetic wave attenuating material 40 may be formed by conducting particles embedded in a dielectric substrate, e.g. ferrite particles embedded in rubber.

Figure 4:
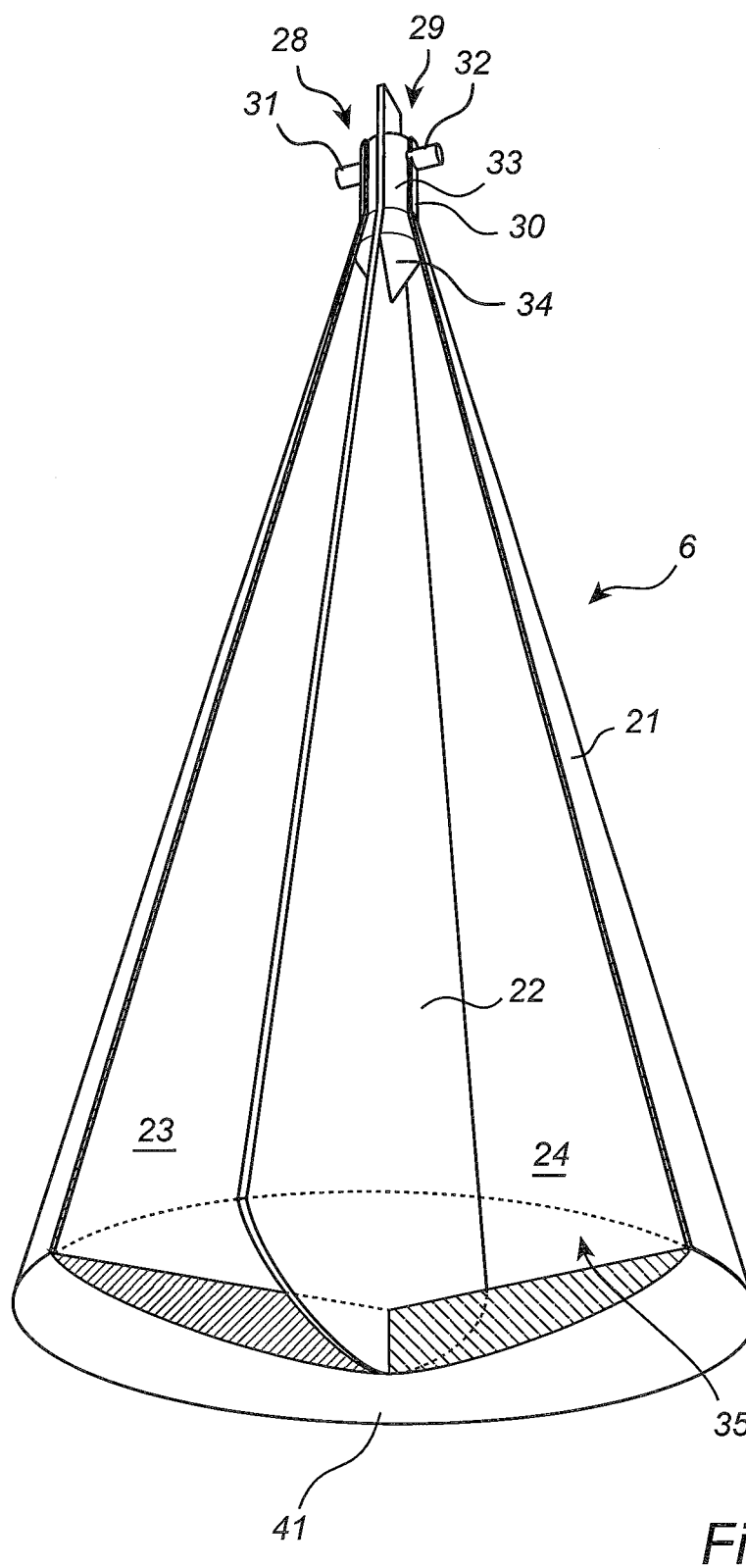
FIG. 4 is a perspective view of a horn antenna according to a third embodiment of the present invention.

The antenna 6" in FIG. 4 is substantially similar to the antenna in FIGS. 2A and 3, and will not be described in further detail. Here, a dielectric lens 41 is arranged to cover the opening 35 of the antenna horn 21, and serve as the electromagnetic de-coupling structure. Such a lens may additionally be adapted to compensate for any skewness of the radiation pattern caused by the partition wall 22. It may be implemented in combination with the quarter wave chokes 26 or an electromagnetic wave attenuating material 40 illustrated in FIGS. 2A and 3. However, it may also be implemented without such features, and be adapted to cooperate with the protruding lip portion 25 to reduce electromagnetic coupling between the partitions 23, 24.

In FIG. 4, the lens 41 is arranged entirely outside the opening 35 of the antenna horn 21. However, as recognized by the person skilled in the art, it is known to also fill the antenna horn with a dielectric filing, in order to prevent tank content or atmosphere to enter the horn. In such a case, the dielectric lens 41 may be formed as an outer portion of such dielectric filling.

Figure 5:
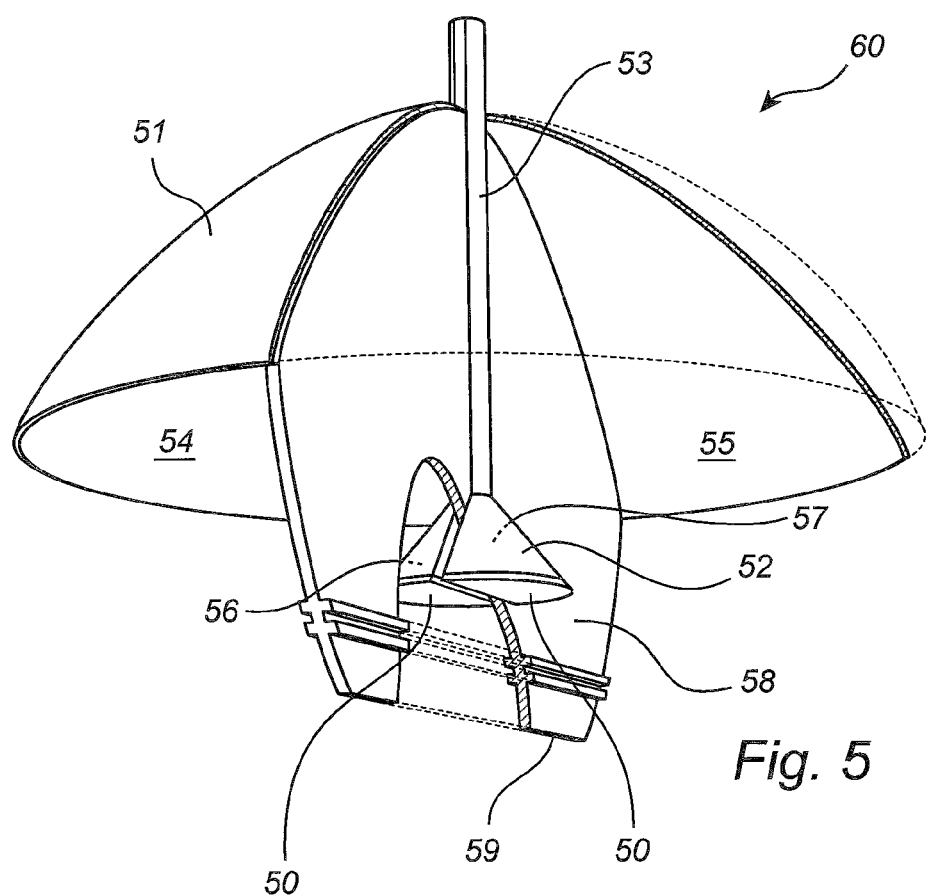
FIG. 5 is a perspective view of a parabolic antenna according to a fourth embodiment of the present invention.

The antenna 60 in FIG. 5 is a parabolic reflector antenna (or parabolic antenna), having a parabolic reflector 51 and an antenna feeder 52 arranged in the focal point of the reflector 51. In the illustrated example, the feeder 52 is arranged on a support 53 protruding from the center of the mirror. The feeder 52 is separated in two channels; one for transmission and one for receiving. The channels may be filled with dielectric material to prevent contamination of the waveguide. At the end of the waveguide there is a splashplate subreflector 50, which directs the electromagnetic waves to the reflector 51.

A partition wall, here in the form of a metal plate 58, is arranged in the interior of the reflector 51, so as to extend between the interior walls of the parabolic reflector thereby dividing it into two partitions, a transmit partition 54 and a receive partition 55. The feeder 52 is arranged in the plane of the plate 54, so that the plate also divides the feeder in two partitions, 56, 57. Also here, the plate 54 may be of electrically conducting material, e.g. a metal, or any other suitable material providing electromagnetic separation.

Similar to the antennas illustrated in FIGS. 2-4, the partition wall 58 in FIG. 5 is connected to an electromagnetic de-coupling structure 61. The electromagnetic de-coupling structure is here illustrated as quarter wave chokes formed on a protruding lip portion 59 (like in FIG. 2) but may equally well be in the form of an electromagnetic wave attenuating material (FIG. 3) or a lens (FIG. 4).

The parabolic antenna 60 is provided with a coupling arrangement similar to that described with reference to FIG. 2A, and will not be discussed in more detail here. The operation of the parabolic antenna also corresponds to that discussed with reference to FIG. 2A, with the obvious difference that the signals are emitted and received by the antenna feeder 52 via reflection in the reflector 51.

The person skilled in the art realizes that the present invention by no means is limited to the preferred embodiments described above. On the contrary, many modifications and variations are possible within the scope of the appended claims. For example, the antenna may be of different design, thereby requiring a different design of the partition wall. Also, other electromagnetic decoupling structures may be used, in addition to those described herein.

What is claimed is:

1. A level gauge for determining a filling level of a product in a tank, said level gauge comprising:
   a transceiver for transmitting an electromagnetic transmit signal and receiving an electromagnetic echo signal,
   processing circuitry connected to said transceiver and adapted to determine said filling level based on a relationship between said transmit signal and said echo signal,
   a two-channel, directional antenna having an antenna aperture adapted to emit electromagnetic energy in a direction of radiation, said directional antenna being connected to said transceiver and arranged to emit said transmit signal into said tank towards a surface of said product, and to receive said echo signal resulting from a reflection of said transmit signal in said product surface,
   a partition wall dividing said antenna into a first partition for emitting said transmit signal, and a second partition for receiving said echo signal, said partition wall having an outer portion located downstream in said direction of radiation, and
   an electromagnetic coupling arrangement comprising a first waveguide feeder arranged to couple said transmit signal from said transceiver into said first antenna partition, and a second waveguide feeder arranged to couple said echo signal from said second antenna partition to said transceiver,
   an electromagnetic de-coupling structure connected to said outer portion of said partition wall, said electromagnetic de-coupling structure arranged to reduce any leakage of electromagnetic energy from said transmit signal into said echo signal.

2. The level gauge in claim 1, wherein said antenna aperture is defined by an opening of a geometrically delimited interior space of said antenna.

3. The level gauge in claim 2, wherein said antenna is a horn antenna having a neck portion and a substantially conical antenna horn, wherein said electromagnetic coupling arrangement is provided in said neck portion.

4. The level gauge in claim 2, wherein said antenna is a parabolic reflector antenna, including a parabolic reflector and an antenna feeder arranged in a focal point of said reflector for emitting and receiving electromagnetic waves via reflection in said reflector.

5. The level gauge according to claim 4, wherein said antenna feeder is formed by a horn antenna.

6. The level gauge in claim 2, wherein said partition wall includes a protruding lip portion extending outside said opening, and wherein said electromagnetic de-coupling structure is arranged at least partly on said protruding lip portion.

7. The level gauge in claim 1, wherein said electromagnetic de-coupling structure comprises a dielectric lens arranged at said aperture, said lens being arranged to influence a radiation pattern of said antenna.

8. The level gauge in claim 3, wherein said antenna horn is filled by a dielectric material, said material further extending outside said opening to form a dielectric lens arranged to influence a radiation pattern of said horn antenna.

9. The level gauge in claim 1, wherein said electromagnetic de-coupling structure comprises at least one quarter-wave choke, formed as one or several grooves on a surface of said partition wall, said grooves extending substantially perpendicular to the direction of radiation, and having a width selected to correspond to a quarter wave length of a center operating frequency of the level gauge.

10. The level gauge in claim 1, wherein said electromagnetic de-coupling structure comprises an electromagnetic wave attenuating material arranged on the partition wall.

11. The level gauge in claim 10, wherein said electromagnetic wave attenuating material comprises magnetic particles embedded in a dielectric substrate.

12. A two-channel directional antenna for use in a radar level gauge for determining a filling level of a product in a tank, said antenna comprising
an antenna aperture adapted to emit electromagnetic energy in a direction of radiation,
a partition wall dividing the antenna into a first partition for emitting an electromagnetic transmit signal, and a second partition for receiving an electromagnetic echo signal, said partition wall having an outer potion located downstream in a direction of radiation of said antenna,
an electromagnetic coupling arrangement comprising a first waveguide feeder arranged to couple said transmit signal from a transceiver connected to said antenna into said first antenna partition, and a second waveguide feeder arranged to couple said echo signal from said second antenna partition to a transceiver connected to said antenna,
wherein said partition wall comprises an electromagnetic de-coupling structure, connected to said outer portion of said partition wall, said electromagnetic de-coupling structure arranged to reduce any leakage of electromagnetic energy from said transmit signal into said echo signal.

13. The antenna in claim 12, wherein said antenna aperture is defined by an opening of a geometrically delimited interior space of said antenna.

14. The antenna in claim 13, wherein said antenna is a horn antenna having a neck portion and a substantially conical antenna horn, wherein said electromagnetic coupling arrangement is provided in said neck portion.

15. The antenna in claim 13, wherein said antenna is a parabolic reflector antenna, including a parabolic reflector and an antenna feeder arranged in a focal point of said reflector for emitting and receiving electromagnetic waves via reflection in said reflector.

16. The antenna in claim 15, wherein said antenna feeder is formed by a horn antenna.

17. The antenna in claim 13, wherein said partition wall includes a protruding lip portion extending outside said opening, and wherein said electromagnetic de-coupling structure is arranged at least partly on said protruding lip portion.

18. The antenna in claim 12, wherein said electromagnetic de-coupling structure comprises a dielectric lens arranged at said aperture, said lens being arranged to influence a radiation pattern of said antenna.

19. The antenna in claim 14, wherein said antenna horn is filled by a dielectric material, said material further extending outside said opening to form a dielectric lens arranged to influence a radiation pattern of said horn antenna.

20. The antenna in claim 12, wherein said electromagnetic de-coupling structure comprises at least one quarter-wave choke, formed as one or several grooves on a surface of said partition wall, said grooves extending substantially perpendicular to the direction of radiation, and having a width selected to correspond to a quarter wave length of a center operating frequency of the level gauge.

21. The antenna in claim 12, wherein said electromagnetic de-coupling structure comprises an electromagnetic wave attenuating material arranged on at least one side of the partition wall.

22. The antenna in claim 21, wherein said electromagnetic wave attenuating material comprises magnetic particles embedded in a dielectric substrate.

23. A method for gauging a filling level of a product in a tank, comprising the steps of:
generating electromagnetic transmit signals,
guiding said transmit signals to a two-channel, directional antenna, having a partition wall dividing said antenna into a first emitting partition and a second receiving partition,
emitting said transmit signals from said emitting partition,
receiving an electromagnetic echo signal reflected at a surface of said product in said receiving partition,
determining said filling level based on a relationship between said transmit signals and said echo signals,
reducing leakage of electromagnetic energy from said transmit signals into said echo signals by providing said partition wall with an electromagnetic de-coupling structure, connected to an outer portion of said partition wall.

24. The method in claim 23, wherein said leakage is reduced by attenuating electromagnetic wave propagation along the surface of said partition wall.

* * * * *